Nov. 1, 1949.   V. DAHLMAN   2,486,520
AIR FILTER
Filed March 6, 1946   5 Sheets-Sheet 1
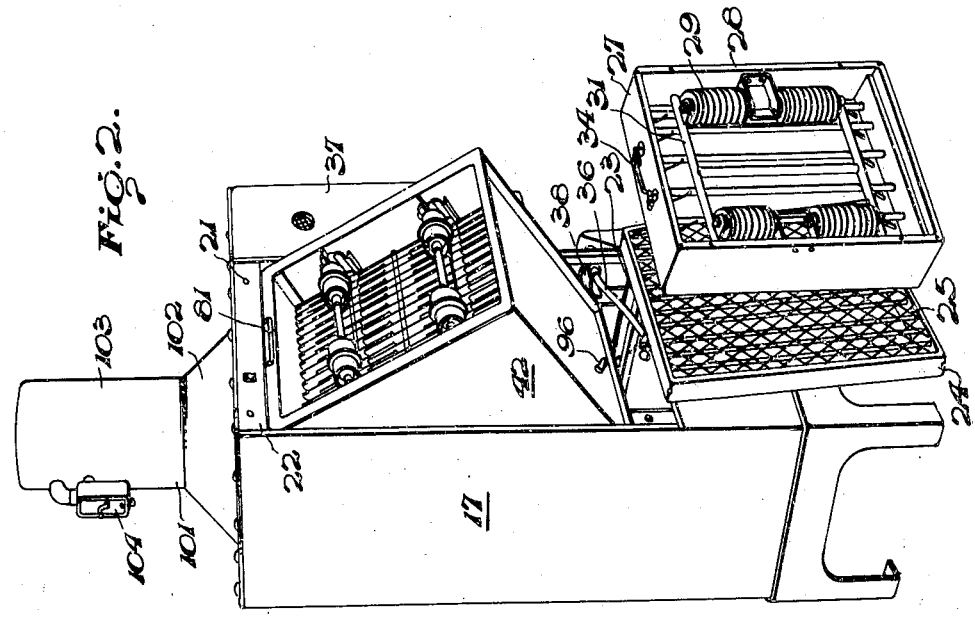
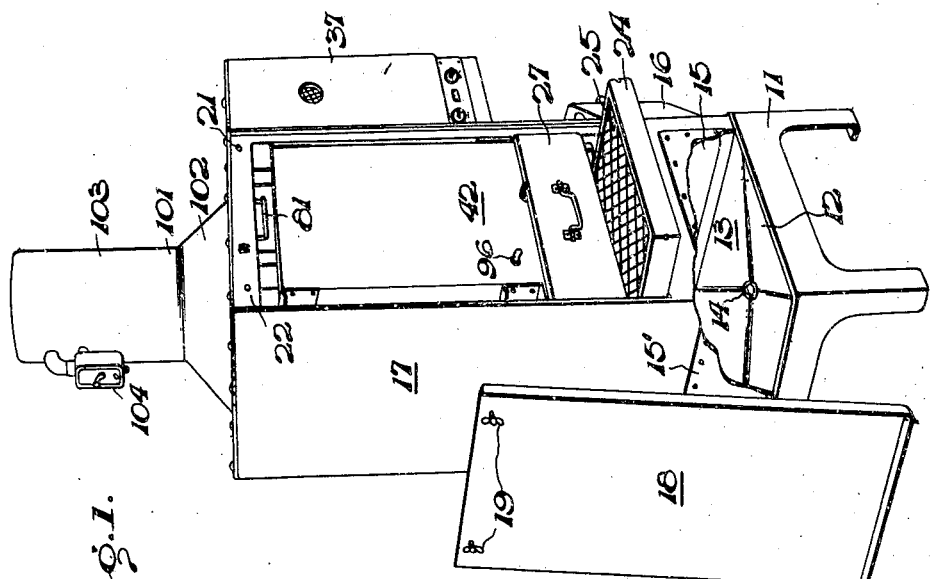
Inventor
Verner Dahlman
By Arthur H. Robert
Attorney

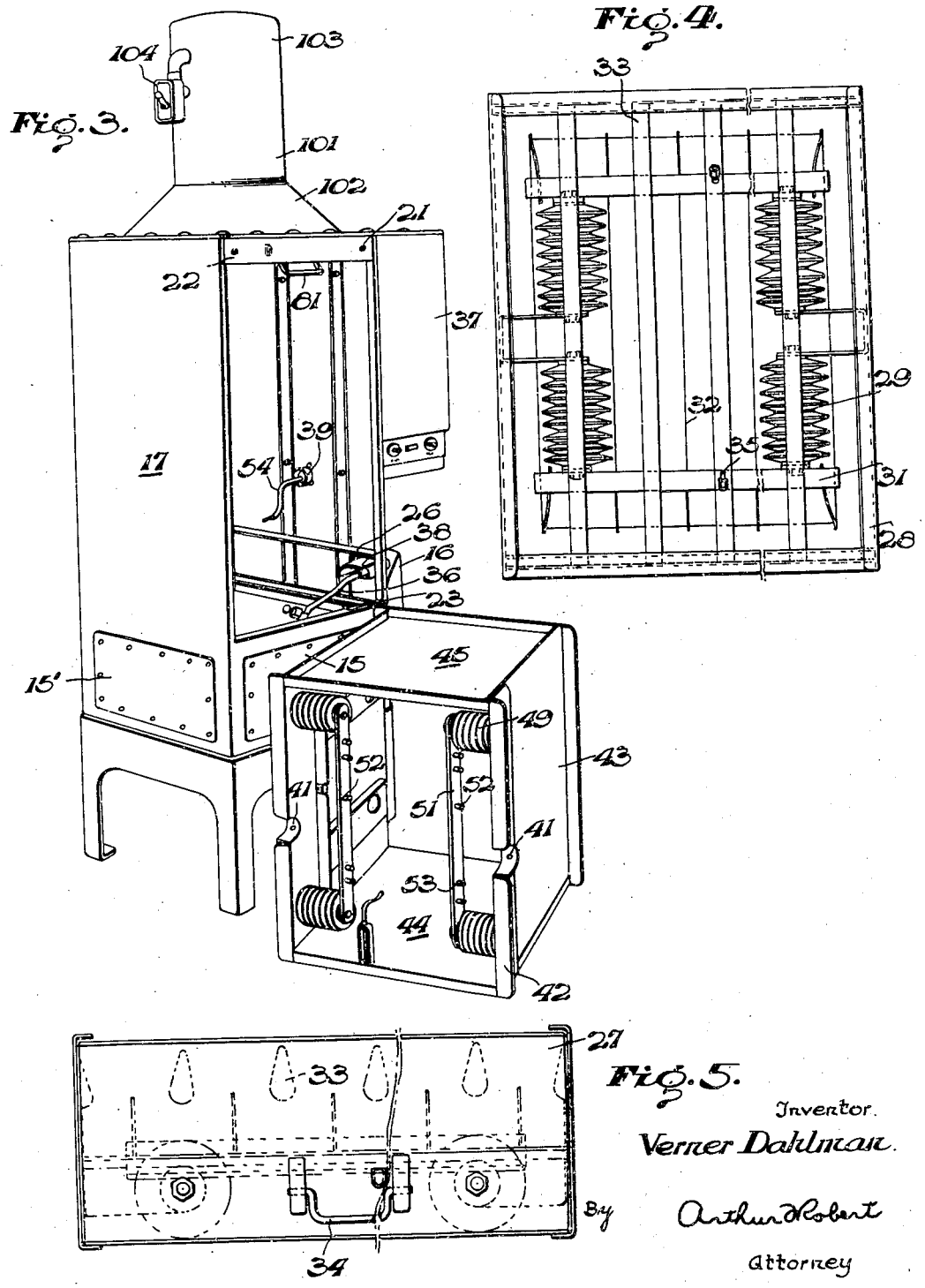

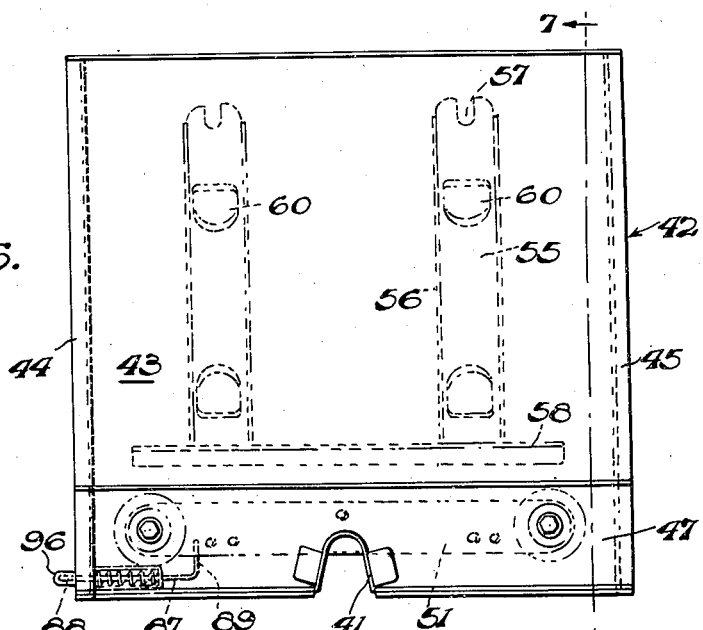

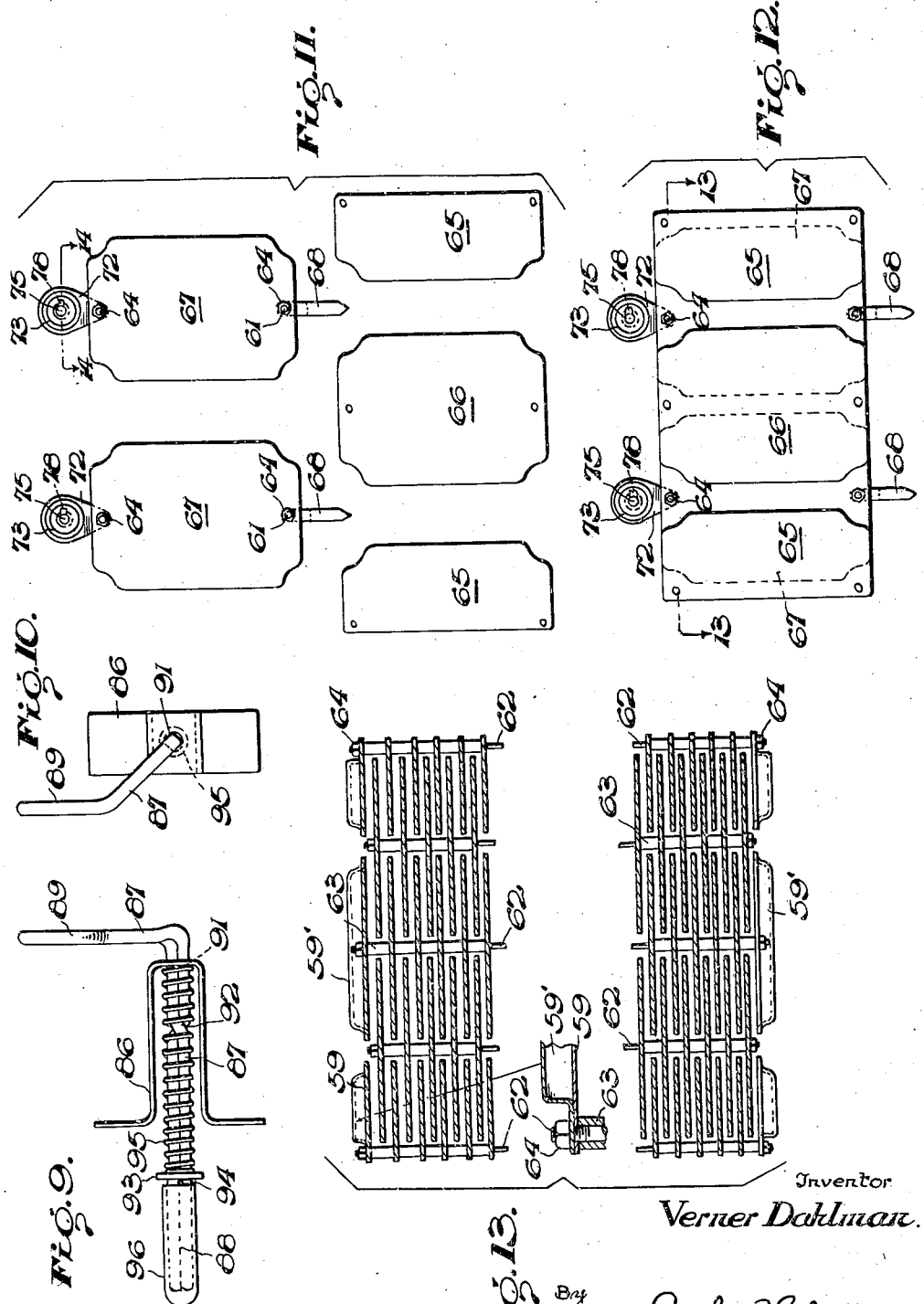

Nov. 1, 1949.  V. DAHLMAN  2,486,520
AIR FILTER
Filed March 6, 1946  5 Sheets-Sheet 5
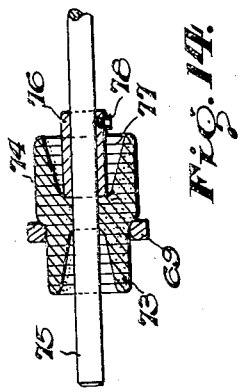
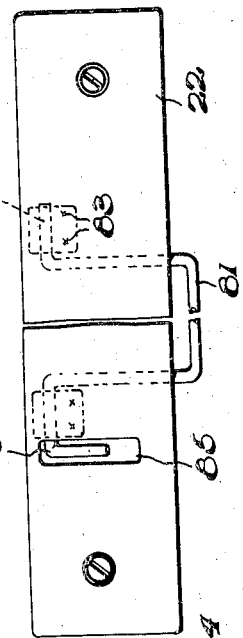
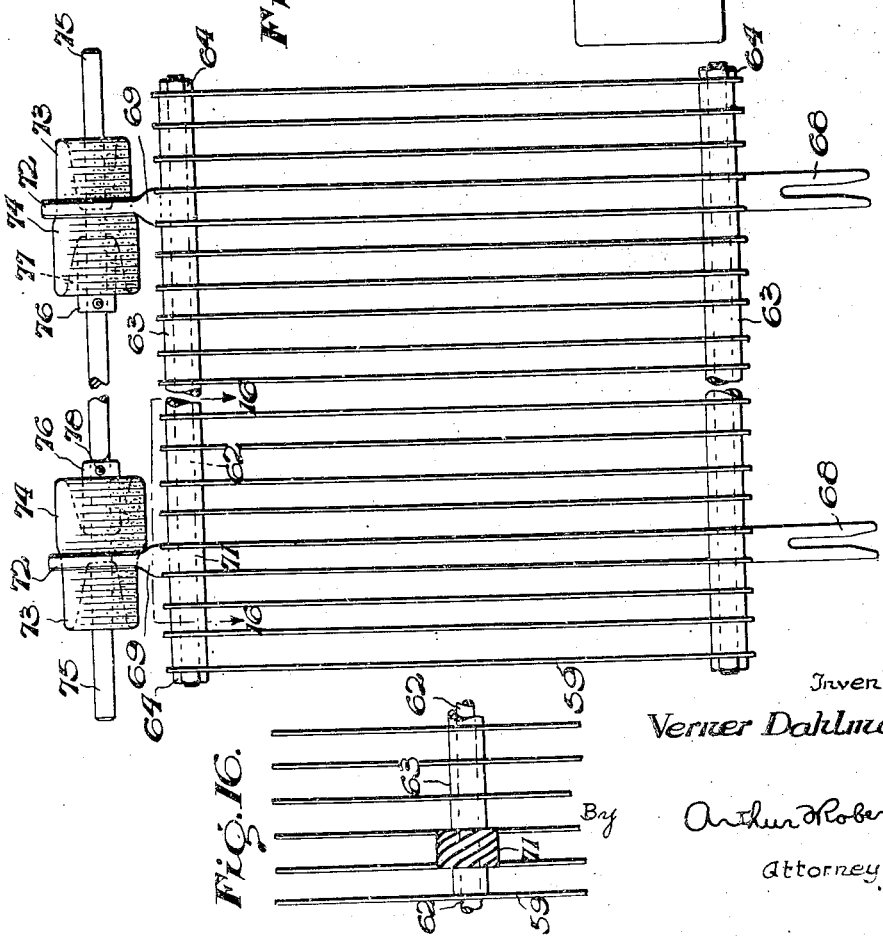
Inventor
Verner Dahlman.
By Arthur Robert
Attorney Patented Nov. 1, 1949

2,486,520

UNITED STATES PATENT OFFICE 2,486,520

AIR FILTER

Verner Dahlman, Louisville, Ky., assignor to American Air Filter Company, Inc., Louisville, Ky., a corporation of Delaware Application March 6, 1946, Serial No. 652,421

18 Claims. (Cl. 183—7)

This invention relates to an electrical precipitating unit, and more particularly to a unit for the electrical precipitation of foreign matter such as oil mist from air.

The problem of the removal of foreign matter such as oil mist from air in the vicinity of machining operations, as where a lubricant is used, has been a considerable one. Devices hitherto employed have not been as flexible as desired as regards placement or cleaning and/or replacement of parts. This is particularly true of units employing electrically opposite series of spaced parallel plates arranged in interleaved relation within a box-like housing that is open at opposite ends to permit a flow of fluid therethrough, in combination with an ionizer in the path of fluid flow. Such plates may be cleaned to some extent in situ. However over a period of time, cleaning of the accumulated deposits require removal or replacement of the plates which is a considerable task in present structures. For this reason, removal or replacement is not accomplished until the efficiency of the unit has been materially reduced. Obviously, the ability to remove such plates for cleaning and/or replacement easily and quickly is desirable to maintain such a unit at maximum efficiency.

In overcoming the aforesaid disadvantages, it is an object of this invention to provide a novel electrical air cleaning unit that is highly flexible in placement and use, highly efficient, and adapted to be readily disassembled for cleaning or replacement of the elements thereof.

A further object of this invention is the provision of novel supporting means for the plate assemblies in an air cleaner of the electrical precipitating type whereby the plates are accurately and rigidly positioned in the path of fluid flow while the unit is in operation, and capable of ready removal and cleaning and/or replacement when the unit is not in operation.

Further objects and advantages will appear from the following description of a preferred embodiment of this invention, reference being made to the accompanying drawings.

Fig. 1 is a perspective of a unit embodying the present invention with the cover panel entirely removed and the prefilter partly removed.

Fig. 2 is a view similar to that of Fig. 1 with the prefilter and ionizer removed and the collector or precipitating cell tilted in plate removal position, the prefilter and ionizer being shown in perspective in front of the unit.

Fig. 3 is a view similar to that of Fig. 2 with the collector removed and disposed in front of the unit.

Fig. 4 is a plan of the ionizer of Figs. 1 and 2.

Fig. 5 is a front elevation of the ionizer of Fig. 4, the principal elements therein being shown in dotted lines.

Fig. 6 is a side elevation of the collector housing, showing one yoke assembly in elevation and some of the interior elements in dotted lines.

Fig. 7 is a section taken on the line 7—7 of Fig. 6.

Fig. 8 is a view of the bottom of the housing of Fig. 6.

Fig. 9 is a side elevation of the assembly for grounding the collector cell when access thereto is desired.

Fig. 10 is a front elevation of the assembly of Fig. 9.

Fig. 11 is an end elevation of the plate assemblies used in the collector cell.

Fig. 12 is an end elevation of the assemblies of Fig. 11 in assembled relation as they appear within the collector cell.

Fig. 13 is a partial section taken on the line 13—13 of Fig. 12 with a portion of the securing means omitted for the sake of clarity.

Fig. 14 is a section taken on the line 14—14 of Fig. 11 with the lower plate assembly omitted.

Fig. 15 is a side elevation of one of the two upper plate assemblies of Fig. 11.

Fig. 16 is a section taken on the line 16—16 of Fig. 15.

Fig. 17 is a front elevation of the locking assembly for locking the collector housing in its operative or access positions.

Referring to Figs. 1-3 incl., the collector includes a base 11, a liquid collecting chamber 12 having a floor 13, inclining to a liquid drain 14, and an inlet 15 from a conduit 16 for the entrance of the air to be cleaned. Inlet 15 can be positioned on any side of the collector by the provision of removable panels 15' on the several sides of chamber 12, it being possible to remove any panel and substitute conduit 16 therefor.

The unit rises above chamber 12 with side walls 17, a rear wall (not visible), a removable front panel 18, secured at the bottom by insertion inside the front wall of chamber 12 and at the top by thumb nuts 19 engaging apertures 21 in a depending upper flange 22.

Horizontal guides 23 (Fig. 3) are provided above chamber 12 for the reception and support of a horizontally slidable and removable prefilter cell 24, preferably formed as a metal frame of a size to contact and effect a seal with the adjacent sides of the housing to compel the air to be cleaned to pass through the prefilter. As the composition of the filter element 24 forms no part of the present invention, it is sufficient to describe it as composed of a grating and a metallic filter element 25 of conventional type and adapted to screen relatively large particles of foreign matter from the air passing therethrough. As filter element 25 is wetted by the oil mist contained in the air, a somewhat viscous coating is formed on the filter element which increases the efficiency thereof.

Horizontal guides 26 (Fig. 3) are secured to the side walls of the collector above guides 23 for the reception of a slidable ionizer 27. As the internal structure of the ionizer forms no part of the present invention, it is believed sufficient to state that it conventionally includes a metal frame 28 supporting insulators 29 supporting bus bars 31, and, in turn, ionizing wires 32, grounded electrodes 33 being extended across the frame panel between the wires. A handle 34 is provided at the front of the ionizer to facilitate its withdrawal from the housing, an electrical connection 35 being provided for the bus bars.

A conductor 36 (Fig. 3) is provided to conduct the charge to the ionizing wires from a power pack 37 of conventional type, the conductor leading into the housing beneath a skid plate 38 which protects the conductor as the ionizer is slid into and out of the housing. It will be noted that the conductor cannot be connected or disconnected from the contact 35 on the ionizer except when the prefilter is removed.

Above the ionizer, the housing is provided with a pair of opposed hollow trunnions 39 on its opposite sides adapted to receive and support a pair of opposed yoke assemblies 41 on the bottom of a collector or precipitator cell housing 42. Yokes 41 are offset or off-center toward the front of the housing for a purpose to be later described.

The collector cell or precipitator chamber housing 42 (Figs. 6-8) comprises a box-like housing having side walls 43, a front wall 44 and rear wall 45, the opposed ends 46 being open whereby when positioned in the housing in the position shown in Fig. 7, the gas flow passes vertically upward therethrough.

A reenforcing strip 47 is provided in conjunction with yokes 41, the side walls 43 on each side of the yokes being formed with flanges 48 extending horizontally to engage the top of the ionizer frame and effecting a substantial seal therewith to prevent the bypassing of the air.

Insulators 49 are provided in pairs at each side of the housing to support bus bars 51 having contacts 52 and panel pins 53 thereon. At least one of the bus bars is connected through a contact 52 and a conductor 54 (Fig. 3) extending through a hollow trunnion 39 to power pack 37. Only one such bus bar need be connected to the power pack as the bus bars are connected to each other through plate assemblies as will be later described.

The side walls 43 of the housing are provided with opposed track-forming members 55, characterized by side walls 56 and notches 57 in the upper ends, the bottoms of the pairs of track-forming members being connected by horizontal flanges 58. Members 55 are secured to the housing walls by ears 60 cut from the members and bent back into contact with the housing walls as shown in Fig. 7 and spot-welded or otherwise secured thereto.

It is to be understood that the positions and dimensions of members 55 may be varied to accommodate different types and sizes of plate assemblies. The arrangement shown in the illustrated embodiment accommodates three sets of assemblies of one electrical sign and two sets of assemblies of the opposite electrical sign, the specific structure thereof being illustrated in the co-pending application of Vernar Dahlman, S. N. 591,283 filed May 1, 1945. As the assemblies are basically the same except for shape and type of connection, reference is made to the assembly of Fig. 15, shown at the upper part of Fig. 11. The assembly includes a plurality of individual metal plates 59 preferably of aluminum or magnesium which has been treated with caustic to roughen the surface, perforated at 61 to receive rods 62, spacers 63 being provided between the individual plates, the whole being secured by jam nuts 64, threaded onto the ends of the rods. Pan-shaped elements 59 are secured at the ends of the assemblies to complement the shape of track members 55 and the adjacent housing walls to substantially effect a seal at the sides of the assemblies.

Thus formed, end assemblies 65 and the center assembly 66 may be inserted in the top of housing 42, the end assemblies being inserted between the front and rear walls of the housing and the adjacent opposing track 56, and the central assembly between opposing tracks 56. As the assemblies are in metallic contact with the housing, they are grounded.

Referring again to Fig. 15, the charged assemblies 67 are formed on their lower ends with forks 68 secured about rods 62 in lieu of spacers 63 and adapted to engage bus bars 51 between pins 53. At their upper ends, assemblies 67 are formed with members 69 shaped at one end 71 (Fig. 16) to serve as a spacer between adjacent plates and apertured at the other end 72 to receive the reduced end 73 of an insulator 74 (Fig. 14). Insulator 74 is apertured to receive a rod 75, the rod being positioned with respect to the two insulators of each plate assembly by collars 76 in the conical recesses 77 in the inside ends of the insulators. Collars 76 are provided with set screws 78, permitting the locking of rod 75 in any desired position.

In inserting assemblies 67, the assemblies are lowered into the housing in a manner such that forks 68 embrace bus bars 51 between pins 53, and the ends of rods 75 engage and are supported by notches 57 in members 55. The plates of assemblies 67, which are charged through the bus bars, are then interleaved with the grounded assemblies 65 and 66 as shown in Fig. 13.

In assembly, the collector cell is inserted in the unit through the open or access side, yokes 41 being engaged about trunnions 39. In the position shown in Fig. 2, the plate assemblies can be easily placed in the cell in the manner already described. The precipitator housing 42 is then rotated backward about the trunnions until the open ends are in vertical alignment and conductor 54 connected to contact 52. The housing will tend to remain in a vertical position by reason of the horizontal offset or off-center position of yokes 41 toward the front wall.

To insure against the precipitator cell housing tilting forward and to lock it in the access position shown in Fig. 2, a lock as shown in Fig. 17 is preferably provided. The lock includes a depending U-shaped rod 81 extending slightly below the bottom of the flange 22, with its horizontally extending upper ends 82, mounted to rotate freely in brackets 83, spot-welded or otherwise secured to the inside of the flange. The left end of the rod is extended and bent downwardly at 84 in an aperture 85 formed in flange 22 whereby the rod can be easily manipulated from the front of the cabinet.

When the collector or precipitator cell is tilted to the access position of Fig. 2, the upper face of the rear wall of the cell is contacted by the bight of rod 81 and the housing held against further tilting. To release the housing for removal from the unit, the cell is tilted back slightly and end 84 of rod 81 pushed backward to rotate the bight of rod 81 back and up out of the way.

To insure grounding of the charged plate assemblies in the collector or precipitator cell when access to the housing is desired, a safety device is provided in the front wall 44. The device includes a U-shaped bracket 86 secured to the wall as shown in Figs. 6, 7, and 8 and supporting a rod 87 (Figs. 9 and 10), one end of which projects through wall 44 at 88 and the other end 89 through a square aperture 91 in the bracket, the latter end being shaped as shown in Fig. 10. Rod 87 is of square cross-section as shown to fit relatively snug in aperture 91, the rod being formed with a 90 degree twist at 92. A washer 93, secured by a cotter pin 94 is mounted on the rod to secure a coil spring 95 about the rod, the opposite end of the spring being pressed against the end of the bracket. An insulating cap 96 is secured about end 88 of the rod outside the housing to prevent the conduction of any charge to the removable panel.

In the operative position, end 88 of the rod is pushed into the housing by front panel 18 against the force of spring 95, causing end 89 of the rod to take a somewhat vertical position out of contact with adjacent bus bar 51. When the front panel of the unit is removed, the spring acts on washer 93 to force the rod to the left as viewed in Figs. 8 and 9 whereupon the 90 degree twist at 92 passes through square aperture 91 and rotates the rod to a position where the end 89 is brought into firm contact with the bus bar as shown in Figs. 7 and 8, thereby grounding the cell.

The top of the unit is closed by a member 101, shaped at its lower end to conform to the cross-section of the housing and secured thereto in fluid-tight relation. Member 101 rises from the top of the housing through a tapered section 102 to a cylindrical section 103. An exhaust fan (not shown) is mounted in section 102, a switch 104 being provided therefor.

In the position shown in Fig. 1 with the additional steps of pushing in the prefilter and replacing the front panel, the unit is ready for operation. In operation, it is connected through conduit 16 to a source of the air to be cleaned such as a machine about which oil mist may be generated. With the exhaust fan turned on, the power pack in operation, and all connections secured, the oil-laden air is drawn into chamber 12 and up through prefilter 24 where the large particles of foreign matter are removed.

The air, which now contains oily particles too small to be removed by the prefilter, passes through ionizer 27 where the particles are charged in well known manner. The charged particles then pass into the collector or precipitating cell where they are collected on the plate assemblies, the cleaned air then passing out at the top of the unit.

By reason of the vertical relation of the several units, the oil collected thereon will flow by gravity onto the floor of chamber 12 and through drain 14 to a suitable collector. In dripping back through prefilter 24, the oil tends to wash the particles of foreign matter therefrom and keeps the filter clean.

By reason of its construction, the unit may be readily cleaned and parts thereof replaced. In such cleaning, the front panel is first removed, thereby grounding the collector cell. Prefilter 24 is then removed and either cleaned or a replacement prepared therefor. After the removal of the prefilter but not before, the ionizer conductor can be disconnected and the ionizer removed. The conductor leading to the collector can then be disconnected and the cell tilted forward to the access position shown in Fig. 2 where it is held by the lock 81. The plate assemblies can then be lifted therefrom and cleaned or replacements substituted therefor. If it is desired to clean the cell housing, the lock 81 can be lifted, the cell tilted forward and removed from the unit. In assembling the unit, the reverse procedure is followed.

From the above, it will be seen that the unit is both compact and highly efficient. It is portable and flexible to a degree that it can be readily placed where needed and the conduit 16 connected as described to any type housing. The hitherto considerable problem of cleaning and/or replacement of the elements is practically eliminated by reason of the ease of access thereto and the facilities for ready removal and replacement. Consequently, the unit may be cleaned at frequent intervals with but little trouble and loss of time, and its maximum efficiency maintained.

Having described my invention, I claim:

1. An electrical precipitating unit comprising: a substantially vertical housing containing a cell open at opposite ends to accommodate a gas flow therethrough; a pair of separable assemblies of spaced-parallel plate electrodes operatively positioned within the cell and extending transversely across the gas flow path in operative interleaving relation so that successive plates of one assembly extend into successive spaces between plates of the opposite assembly and cooperate therewith to form a series of gas flow passages; means for insulating one assembly from the other; removable means at one side of the housing to enable access to the interior thereof; oppositely disposed trunnions in the side walls of the housing adjacent the access side; and yoke means on the cell arranged to engage the trunnions to effect support of the cell within the housing, the cell being rotatable about the trunnions to selectively position one open end in the gas flow path or in the access side of the housing to enable access to the plate electrodes contained therein; the cell and the assemblies being so constructed and arranged that the assemblies may bodily be inserted into and removed from their operative positions in the cell through the access side of the housing when one open end of the cell is positioned therein.

2. The unit of claim 1 wherein the yoke means and trunnions are so constructed and arranged that the cell can be bodily removed from the housing when rotated to the access side of the housing.

3. The unit of claim 1 wherein a means is provided to lock the cell in the access position.

4. The unit of claim 1 wherein; at least one trunnion provides a conduit for receiving an electrical conductor for at least one of the assemblies.

5. An electrical precipitating unit comprising: a substantially elongate housing forming a passage for gas flow therethrough; a closure for one side of the housing, operable to provide access to the interior of the housing; oppositely disposed trunnions in the side walls of the housing adjacent the access side; a precipitator cell in the housing open at opposite ends to accommodate the gas flow therethrough; yoke means on the cell arranged to engage the trunnions and effect support of the cell within the housing, the cell being rotatable about the trunnions to selectively position both ends in the gas flow path or one end in the access side of the housing; an electrically charged collector assembly insulatedly supported in the cell; and means mounted in the cell and responsive to opening of the housing closure to ground the charged collector assembly to the cell.

6. The unit of claim 5 wherein the collector assembly includes a bus bar insulatedly mounted in the cell, and the grounding means includes a bracket mounted on the cell with a non-circular aperture therein, and a reciprocable rod of like cross-section in the aperture and having a twisted section whereby on reciprocation of the rod by the closure, the rod is rotated into and out of contact with the bus bar.

7. An electrical air cleaning unit comprising: a substantially vertical elongate housing forming a passage for gas flow therethrough, one side of the housing being arranged to be opened to enable access to the interior thereof; a chamber at the bottom of the housing having an opening therein; means to induce a flow of gas into the chamber at the bottom of the housing through the opening and vertically upward therethrough; a prefilter and an ionizer in the gas flow path above the chamber; means to support the prefilter and ionizer in the housing whereby they may be removed through the access side of the housing; oppositely disposed trunnions in the side walls of the housing adjacent the access side and above the prefilter and ionizer; a precipitator cell in the housing above the ionizer and open at opposite ends to accommodate the gas flow therethrough and including at least two separable and electrically opposite assemblies of spaced parallel plate electrodes operatively positioned stationarily within the cell to extend transversely across the gas flow path with their plates extending along the gas flow path in operative interleaving relationship so that successive plates of one assembly extend into the successive spaces between plates of the electrically opposite assembly and cooperate therewith to form a series of gas flow passages; means within the cell including means for insulating one assembly from the other for supporting the assemblies in a manner whereby they can be inserted into and removed from their operative positions in the cell through one of the open ends; yoke means on the cell arranged to engage the trunnions and effect support of the cell within the housing, the cell being rotatable about the trunnions to selectively position the electrode removal end in the gas flow path or the access side of the housing; and a drain in the chamber arranged to discharge the liquid drained from the air cleaning elements disposed thereabove.

8. An electrical precipitator unit comprising: a housing having a precipitator chamber open at opposite ends and a normally closed access opening at one side of the chamber; an open ended precipitator cell operatively positioned within said chamber with its opposite open ends aligned with the corresponding open ends of the chamber to accommodate a gas flow therethrough; and means for supporting the cell on the housing for movement from its operative position to a maintenance position wherein said cell projects through said housing access opening with one of its open ends foremost and with its interior accessible from the outside of the housing through its foremost open end.

9. The unit of claim 8 wherein the cell supporting means includes: pivot means about which the cell swings in moving between operative and maintenance positions.

10. The unit of claim 8 wherein the cell supporting means includes: trunnions about which the cell swings in moving between operative and maintenance positions; and yoke means on the cell to engage the trunnions rotationally.

11. The unit of claim 8 wherein the cell supporting means is so constructed and arranged that the cell can be bodily removed from the housing when it is in its maintenance position.

12. The unit of claim 8 wherein the cell supporting means includes: trunnions about which the cell swings in moving between operative and maintenance positions; and yoke means on the cell to engage the upper side of the trunnions rotationally, the cell and the yoke means being so constructed and arranged that they can be bodily removed from the housing when the cell is in its maintenance position.

13. An electrical precipitator unit comprising: a housing having a precipitator chamber open at opposite ends and a normally closed access opening at one side of the chamber; an open ended precipitator cell operatively positioned within said chamber with its opposite open ends aligned with the corresponding open ends of the chamber to accommodate a gas flow therethrough; means for supporting the cell on the housing for movement from its operative position to a maintenance position wherein said cell projects through said housing access opening with one of its open ends foremost and with its interior accessible from the outside of the housing through its foremost open end; electrical precipitating means including at least one assembly of spaced parallel plate electrodes operatively arranged stationarily within said operatively positioned cell to extend transversely across said gas flow path with its plates extending longitudinally along said path; and means for removably supporting said assembly on the cell; said assembly and cell being so constructed and arranged that, when said cell is in its maintenance position, said assembly may bodily be manually removed from the cell through its foremost open end.

14. The unit of claim 13 wherein the cell supporting means includes: pivot means about which the cell swings in moving between operative and maintenance positions.

15. The unit of claim 14 wherein said pivot means includes: trunnions mounted on the housing; and yoke means on the cell to engage the trunnions rotationally.

16. The unit of claim 13 wherein: a closure is provided for said normally closed access opening; said electrical precipitating means includes at least one assembly of spaced parallel plate electrodes which are electrically insulated from ground; and means responsive to the removal of said closure is provided for electrically grounding said insulated assembly.

17. An electrical precipitating unit comprising: a housing having a gas flow duct and a normally closed access opening in one side of the duct; an open ended ionizer operatively mounted on the housing to extend across said duct adjacent said access opening and arranged for removal from and insertion into its operative position through said access opening; an open ended precipitator cell operatively positioned across said duct adjacent both said access opening and the down stream face of said ionizer cell; and means for supporting the precipitator cell on the housing for movement from its operative position to a maintenance position wherein the down stream end of said cell projects through said housing access opening to render its interior accessible from the outside of the housing while its upstream end projects into the space provided for occupation by an operatively positioned ionizer so that the ionizer and the precipitator cell cooperate not only to prevent the movement of an operatively positioned precipitator cell to its maintenance position before the removal of the ionizer but also to prevent the re-insertion of a removed ionizer before the precipitator cell is returned to its operative position.

18. The unit of claim 17 wherein the ionizer and precipitator cell are provided with marginal flanges which, in the operative position of said ionizer and cell, cooperate to form a seal preventing the passage of gas therebetween.

VERNER DAHLMAN.

REFERENCES CITED

The following references are of record in the file of this patent:

UNITED STATES PATENTS

| Number | Name | Date |
| --- | --- | --- |
| 346,648 | Duff | Aug. 3, 1886 |
| 370,557 | Petersen | Sept. 27, 1887 |
| 2,233,639 | Pegg | Mar. 4, 1941 |
| 2,307,603 | Penney | Jan. 5, 1943 |
| 2,380,992 | Pegg et al. | Aug. 7, 1945 |